United States Patent [19]

Lauzon et al.

[11] Patent Number: 5,978,131
[45] Date of Patent: Nov. 2, 1999

[54] IN-FIBER TWO-STAGE AMPLIFIER PROVIDING WDM SIGNAL CONDITIONING

[75] Inventors: Jocelyn Lauzon, St-Augustin-de-Desmaures; Martin Guy, Cap-Rouge, both of Canada

[73] Assignee: Institut National D'Optique, Ste-Foy, Canada

[21] Appl. No.: 09/056,227

[22] Filed: Apr. 7, 1998

[51] Int. Cl.[6] .............................. H04B 10/16; H04J 14/02; H01S 3/00
[52] U.S. Cl. ........................... 359/341; 359/160; 359/177; 359/337; 385/12; 385/27
[58] Field of Search .................................. 359/160, 174, 359/177, 161, 337, 341; 385/12, 27

[56] References Cited

U.S. PATENT DOCUMENTS

| | | | |
|---|---|---|---|
| 5,532,864 | 7/1996 | Alexander et al. | 359/177 |
| 5,541,766 | 7/1996 | Mizrahi et al. . | |
| 5,557,442 | 9/1996 | Huber . | |
| 5,677,786 | 10/1997 | Meli | 359/341 |
| 5,701,194 | 12/1997 | Meli et al. | 359/341 |
| 5,742,416 | 4/1998 | Mizrahi | 359/134 |
| 5,778,118 | 7/1998 | Sridhar | 385/24 |
| 5,812,306 | 9/1998 | Mizrahi | 359/341 |
| 5,812,712 | 9/1998 | Pan | 385/37 |
| 5,825,520 | 10/1998 | Huber | 359/130 |

FOREIGN PATENT DOCUMENTS 2201564  11/1997  Canada .

OTHER PUBLICATIONS

"Dynamic Gain Compensation in Saturated Erbium–Doped Fiber Amplifiers" by E. Desurvire et al, IEEE Photonics Technology Letters, vol. 3, No. 5, May 1991, pp. 453–455.
"Gain Control in Erbium–Doped Fibre Amplifiers by an All–Optical Feedback Loop" by E. Desurvire et al, Electronic Letters, Mar. 28, 1991, vol. 27, No. 7, pp. 560–561.
"Dispersion Cancellation Using Linearly Chirped Bragg Grating Filters in Optical Waveguides" by François Ouellette, Optics Letters, Oct. 1987, vol. 12, No. 10, pp. 847–849.
"Optimized Two–Stage In–Line Balanced Optical Amplifier Design" by J.M.P. Delavaux et al, Optical Fiber Technology 1, 1995, pp. 239–243.
"Multichannel Equalised and Stabilised Gain Amplifier for WDM Transmissions" by E. Delevaque et al, Electronics Letters, Dec. 7, 1995, vol. 31, No. 25, pp. 2149–2150.
"Study of Power Transients in EDFA with Gain Stabilisation by a Laser Effect" by R. Lebref et al, Electronics Letters Online, vol. 33, #3, pp. 191–193.
"Study of an 8×2.5 GBit/S Experimental WDM Transmission System with Gain Stabilized and Equalized Erbium Doped Fibre Amplifiers" by R. Lebref et al, ECOC 97, Sep. 22–25, 1997, Conference Publication No. 448, IEE, 1997, pp. 37–40.
Martin et al, CLRO '94, vol. 8, pp. 242 abstract only herewith, May 13, 1994.
Delavaux et al, p. 95–9, Dc. XP20362701, Sep. 25, 1994.

*Primary Examiner*—Nelson Moskowitz
*Attorney, Agent, or Firm*—James Anglehart; Samuel Shipkovitz; James Angelhart

[57] ABSTRACT

The amplifier is a two-stage amplifier in which dispersion compensation and WDM channel equalization are carried out using a plurality of in-waveguide Bragg gratings placed between the two stages. The first stage has a gain able to raise the intensity of WDM optical communications signals to a high enough level that after dispersion compensation and equalization, the signals fed into the second stage nearly or substantially saturate the second stage amplifier. The noise figure signal-to-noise ratio is thereby of good quality since there are no significant losses at the signal input of the signal into the optical amplifier. Erbium-doped optically pumped fiber amplifiers are used for the two stages. An add/drop filter can be appended to the end of the conditioning Bragg gratings. Residual optical signal from the fiber Bragg grating may be used to optically pump another amplifier for amplifying longer wavelength optical signals.

8 Claims, 3 Drawing Sheets

IN-FIBER TWO-STAGE AMPLIFIER PROVIDING WDM SIGNAL CONDITIONING

FIELD OF THE INVENTION

The present invention relates to an in-fiber or in-waveguide all optical amplifier. In particular, the invention relates to an all optical amplifier for use in fiber optic telecommunications, such as wavelength division multiplexing (WDM) communications, in which optical signal conditioning is provided.

BACKGROUND OF THE INVENTION

WDM optical communication systems are today's leading edge state-of-the-art. In a very near future, the high-data-rate WDM channels will have a predetermined spectral position (proposed ITU-Grid). When a WDM wavelength grid standard will be settled upon, it will be possible to act on each discrete channels independently.

For high-data-rate (greater than 1 Gbps per channel) optical communication systems, chromatic dispersion has a major impact on the transmission performance. Chromatic dispersion results in the spectral components of a laser light signal having different transmission velocities in a same light guide medium, that is the index of refraction changes as a function of wavelength of the light.

A digital WDM optical signal comprises a number of channels each assigned a predetermined optical wavelength or frequency. For each channel, a transmitting optical source, such as a laser, operates at the predetermined channel wavelength and sends through a waveguide a series of pulses encoding the data. In practice, an optical source does not emit light at a precise single wavelength, but rather the energy of the optical source is output within a narrow range of wavelengths around the predetermined channel wavelength. In a dispersive lightguide, such as an optical fiber, a "clean" squarå pulse input into a fiber will exit from the optic fiber kilometers away with a certain degree of spread in time due to dispersion. Such spilling over of signal from one bit time slot to another can lower the pulse intensity level for the one bit, thus reducing the threshold for reliable detection, and also cause otherwise blank or zero level bit time slots to contain signal, thus requiring a raising of the threshold for zero detection. Even if a detector at the receiver end could precisely detect only an exact wavelength and thus be unaffected by dispersion, the signal energy at the precise wavelength from the optical source would be practically very low. Therefore, as bitrates are increased in optical communications, it is important to provide dispersion compensation, which improves the quality of bit detection and transmission speed.

Chromatic dispersion can be avoided by using fibers having nearly zero dispersion around the wavelength region to be used. However, dispersion has the advantage of decreasing non-linear interactions between the WDM channels that could create major signal distortion. Thus, managing chromatic dispersion with the help of dispersion compensators appears to be a better solution. Chirped fiber Bragg gratings (FBGs) have proven to be efficient devices to provide dispersion compensation. FBGs may be linearly or non-linearly chirped. An in-fiber Bragg grating is created by providing a periodic modulation in the fiber (typically of the index of refraction), the periodicity of which causes reflection substantially at an exact wavelength. A chirped fiber Bragg grating is an extended Bragg grating in which the periodicity changes over the extent of the Bragg grating to reflect different wavelengths at different points in the grating. As a result, the reflected signal has various wavelength components delayed according to wavelength, and the chirped grating can be constructed to cause compensation of dispersion within a WDM optical channel, i.e. slowing down wavelength components which have faster velocities with respect to wavelength components having slower velocities in the fiber.

Chirped Bragg gratings, depending on the degree of dispersion being compensated, may have a length of about 10 cm in fiber for correcting dispersion of a single optical frequency channel. For dispersion compensation of a WDM signal having a plurality of optical channels, a plurality of chirped Bragg gratings, one for each optical channel to be dispersion compensated, is typically used. The channel wavelengths may be standardized ones, as for example those of the proposed ITU grid. A single continuous chirped Bragg grating having a length of about 100 cm could also be feasible for compensating a plurality of channels in a WDM signal. While more complicated to manufacture, such a continuous in-fiber chirped Bragg grating has the advantage that a reconfiguration of the channel spacing in the WDM signal (e.g. to increase a number of channel within a certain optical bandwidth) would not require replacement of the fiber Bragg grating.

In-fiber Bragg gratings and their manufacture are known in the art, as disclosed for example in Appl. Phys. Lett. 62(10), Mar. 8, 1993 at page 1035, "Bragg gratings fabricated in a monomode photosensitive optical fiber by UV exposure through a phase mask" by Hill et al., and in IEE Conference Publication No. 448, ECOC '97, Sep. 22–25, 1997, page 195, "SIMPLE AND FLEXIBLE TECHNIQUE FOR SPECTRALLY DESIGNING ALL-FIBRE FILTER AND APODIZING FIBRE GRATINGS" by Guy et al. The architecture of a Bragg grating dispersion compensator is known in the art, as for example in Optics Letters, Sep. 1, 1994, vol. 19, no. 17, page 1314 "Chirped in fiber Bragg gratings for compensation of optical-fiber dispersion", by Hill et al. Using such a grating for dispersion compensation in association with an EDFA has been proposed in Electronic Letters, Dec. 7 1995, Vol. 31, No. 25, page 2149, "Multichannel equalised and stabilised gain amplifier for WDM transmissions" by Delavaque et al. A plurality of in-fiber signal gratings are provided spaced apart from one another. A Bragg grating in a fiber is provided for each wavelength of light used for optical communication in the fiber. An optical circulator feeds the input signal into the fiber provided with the gratings and then feeds the reflected conditioned channel signals into the output port. These multiple Bragg gratings not only compensate the dispersion over each WDM channel, they also are able to equalize the relative gain of these channels and thus to condition the WDM channels. The gain is equalized by different Bragg gratings having different reflectivities, associated with different WDM channels.

All-optical amplifiers, namely erbium-doped optically pumped fiber amplifiers, used in optical data transmission systems, have the advantage of eliminating opto-electronic repeaters. Signal amplification is required to transmit optical signals over great distances due to fiber losses. When amplifying a WDM signal using an all-optical amplifier, the gain is not uniform with wavelength, thus it is different for the WDM channels. It is therefore advantageous to apply channel equalization so that the amplifier output has the desired signal intensity for each channel.

The combination of dispersion compensation and channel equalization is very advantageous in WDM optical transmission. Both dispersion compensation and channel equalization provide a conditioning of the optical signal that allows for better detection of the transmitted optical signal.

It is desirable to associate signal conditioning with a signal amplification since signal distortion, as signal attenuation, increases proportionally with the propagation distance in the guiding medium. Moreover, signal conditioning with fiber Bragg gratings is always associated with signal losses. The integration of multiple conditioning functions with an optical amplifier into one device allows the optimization of the optical amplifier considering the joint impact of the conditioning functions on the signal. For example, in order for the optical amplifier associated with the "signal conditioner" to have a small noise figure (signal-to-noise ratio deterioration due to the optical amplifier), the signal coming into the amplification stage should have minimal loss. Such a "signal conditioner"/optical amplifier combination with a low noise figure has not been adequately provided by known prior art apparatus.

SUMMARY OF THE INVENTION

It is an object of the present invention to provide an in-waveguide optical amplifier and WDM channel signal conditioner having a system of appropriately designed fiber Bragg gratings to provide good gain and a low noise figure. It is a further object of the present invention to provide such an in-waveguide optical amplifier which carries out both dispersion compensation and equalization of the optical WDM signal.

According to the invention, there is provided an in-waveguide optical amplifier and optical signal conditioner comprising: a first in-waveguide optical amplifier means receiving an input WDM optical signal; an in-waveguide Bragg grating means for carrying out at least one of dispersion compensation and equalization of the WDM signal; a second in-waveguide optical amplifier means; an optical circulator means for optically coupling an output of the first amplifier means to the Bragg grating means and for coupling a reflected output of the Bragg grating means to the second amplifier means. Preferably, the Bragg grating means comprises a cascade, superposition or series of chirped in-fiber Bragg gratings for each of the corresponding WDM channels. Still preferably, the series of chirped Bragg gratings have different reflectivities relative to one another so as to carry out a suitable equalization of the WDM channel signals.

According to the invention, there is also provided a method of conditioning a WDM optical communications signal, comprising the steps of: amplifying the signal in a first in-waveguide stage to a first predetermined level of amplification; optically circulating the amplified signal into an in-waveguide Bragg grating means; and optically circulating the signal reflected from the Bragg grating means into a second in-waveguide amplification stage substantially saturated by the reflected optical signal, an output of the second amplification stage providing the conditioned WDM optical communications signal.

The invention also provides an in-waveguide optical amplifier and dispersion compensation apparatus comprising: an optical wavelength splitter having an input and two outputs; a first level first-stage in-waveguide optical amplifier means receiving a first shorter wavelength one of the two splitter outputs as an input first WDM optical signal; an in-waveguide Bragg grating means for carrying out at least one of dispersion compensation and equalization of the first WDM signal and for providing an optical pumping output of non-reflected wavelengths passing through the Bragg grating means; a first level second-stage in-waveguide optical amplifier means; optical pump means for pumping the first level first-stage and the first level second-stage optical amplifier means; first optical circulator means for optically coupling an output of the first level first-stage amplifier means to the Bragg grating means and for coupling a reflected output of the Bragg grating means to the first level second-stage amplifier means; a second level in-waveguide optical amplifier means receiving a second longer wavelength one of the two splitter outputs as an input second WDM optical signal; means for connecting the optical pumping output of non-reflected wavelengths to the second level optical amplifier means; means for combining an output of the first level second-stage amplifier means and an output of the second level amplifier means together to form a single WDM amplified output signal.

BRIEF DESCRIPTION OF THE DRAWINGS

The invention will be better understood by way of the following description of a preferred embodiment of the invention with reference to the appended drawings, in which.

DETAILED DESCRIPTION OF THE PREFERRED EMBODIMENT

Figure 1:
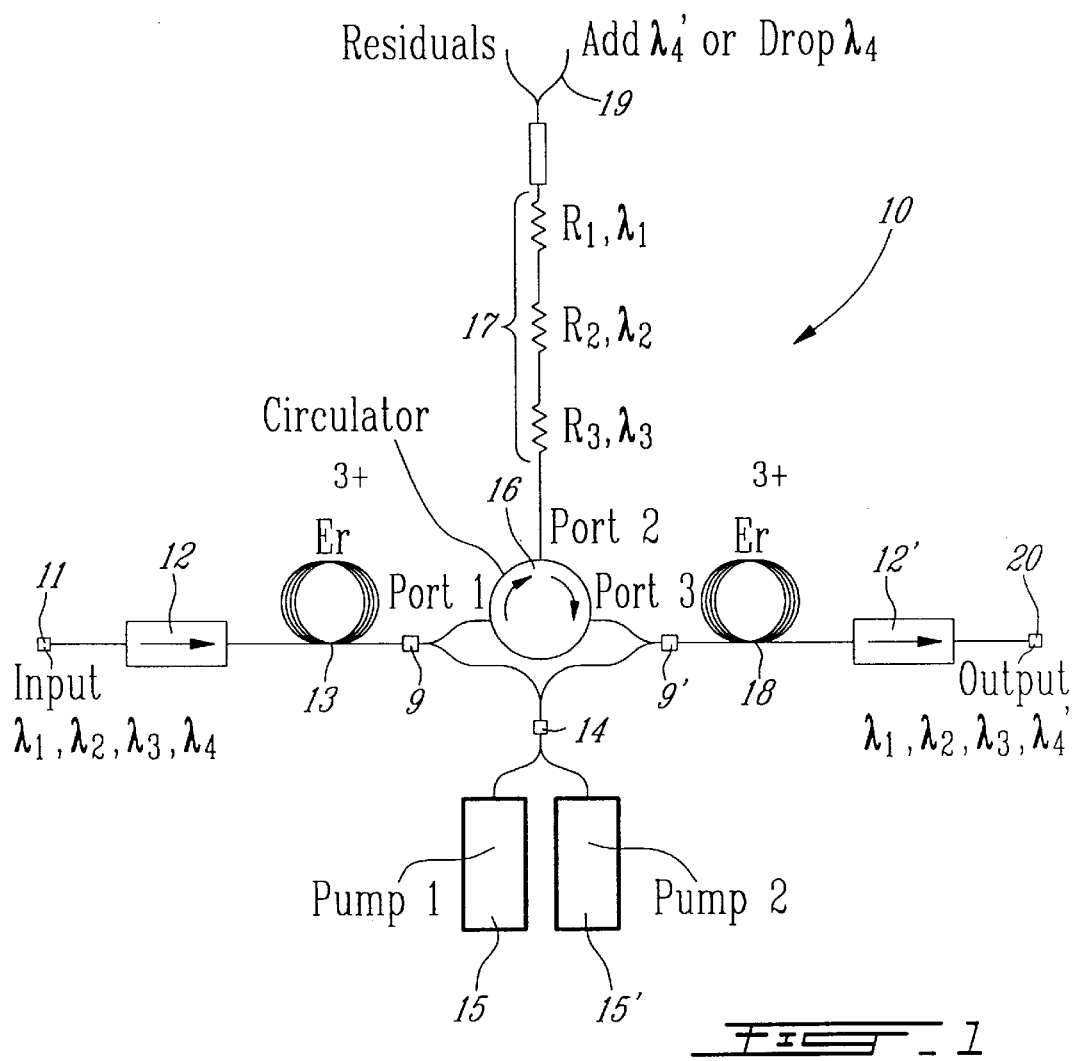
FIG. 1 is a schematic diagram of the optical amplifier according to the preferred embodiment.

As shown in FIG. 1, the amplifier apparatus 10 according to the preferred embodiment has an input 11 an input optical isolator 12 (e.g. model IS15LAA30 from MP Fiberoptics Inc., Sunnyvale Calif.) and a first stage erbiumdoped fiber section 13 (e.g. model Er24, Institut National d'Optique, Quebec City, Canada). Section 13 in combination with the optical pump 15, 15' provide the first stage amplifier means in the preferred embodiment. The input WDM signal is amplified in the first stage amplification medium 13 to a sufficient level that the optical signal reaching the second stage amplification medium 18 will be sufficient to substantially saturate the second stage amplification medium 18. Both the first stage 13 and the second stage 18 are pumped by a common pair of grating stabilized 980 nm laser modules 15 and 15' (e.g. model SDLO-2400-110 having a power of 110 mW from SDL Optics Inc, Saanichton, Canada). The second section 18 of erbium-doped fiber in combination with the optical pump 15,15 provide the second stage amplifier means in the preferred embodiment.

The output from the pumps 15 and 15' are coupled by a 50—50 coupler 14 (e.g. the 3 dB 980 nm fiber coupler SSTD-98-A-2-50-F-B from Sumicem Opto-electronics, Limerick, Ireland). The 50—50 coupling ensures that both amplification mediums 13 and 18 receive the same pumping energy. The exact gain of each amplifier is selected by selecting the length and efficiency of the erbium-doped fiber (due to the components performance and the quality of the fiber splices between these components). WDM couplers 9 and 9' are provided between the amplification mediums 13 and 18 respectively and the couplings to the pumps 15, 15' and the circulator 16 ports 1 and 3 respectively. A suitable WDM coupler is the 980/1550 WDM coupler model SWDM-98-A-1-F-B from Sumicem.

Figure 2:
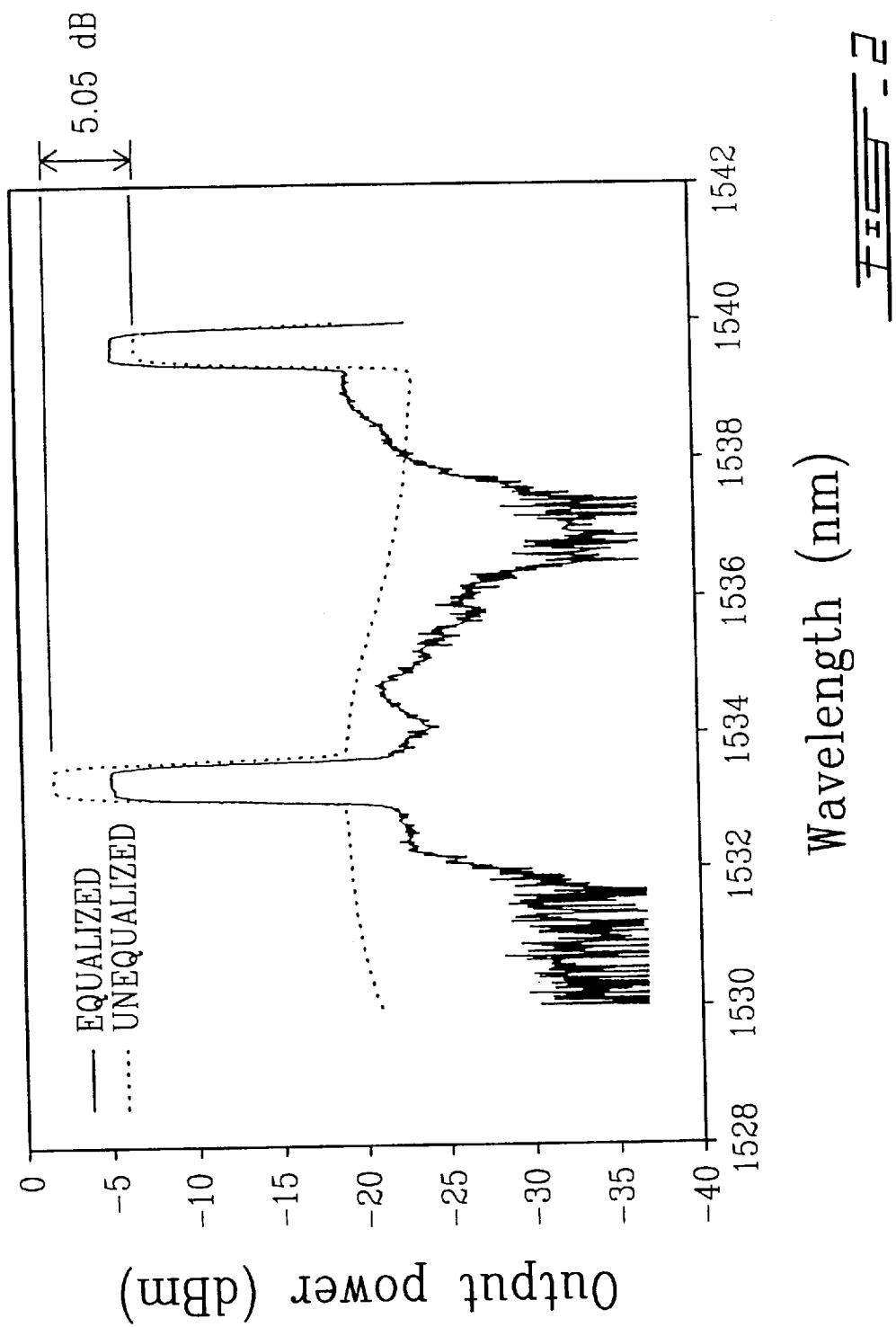
FIG. 2 is a plot of output power from the optical amplifier showing both equalized and unequalized power levels for two optical communications signal wavelengths.

The output from amplifying section 13 is fed into an optical circulator 16 (e.g. model CR2500 from JDS Fitel, Nepean, Canada) at port 1. At port 2 of the circulator 16, a fiber 17 having a plurality of chirped Bragg gratings R1, R2 and R3 recorded therein is coupled. The Bragg gratings reflect with good efficiency light only very near a specific wavelength (for example the proposed ITU WDM wavelengths). The efficiency of reflection can be reduced from the maximum practical level so as to equalize the optical signals at the various wavelengths, as is illustrated in FIG. 2. The technique for creating a Bragg grating in a fiber is known in the art, as for example in the paper by Guy et al. mentioned above and co-authored by Applicants. To provide a series of Bragg gratings in a fiber, the technique is same technique for creating a single grating is used. Dispersion compensation is the result of the longitudinal variation of the reflection wavelength along a chirped Bragg grating which allows for a "compression" of a dispersed light pulse.

As illustrated in FIG. 1, it is possible to choose any particular wavelength for adding or dropping. This is done by omitting a Bragg grating in fiber 17 for the particular WDM channel, and receiving and/or injecting the chosen WDM channel(illustrated as (4 in FIG. 1) at 19. The add/drop filter 19 may comprise a grating-assisted fused fiber filter, as disclosed in IEE Conference Publication No. 448, ECOC 97, Sep. 22–25 1997, at pages 169–172, co-authored by one of Applicants.

The light reflected from the Bragg gratings (and possibly injected at 19) returns to port 2 of the circulator and is fed to the second stage amplifier 18. As previously mentioned, the intensity of the equalized and dispersion compensated WDM optical signals exiting port 3 substantially saturates amplifier 18. A very good gain, saturated output power and noise figure (i.e. signal-to-noise ratio) is thereby achieved. The output from amplifier 1 is fed through isolator 12' to the output 20 of the apparatus 10.

Gain equalization has been tested experimentally using a dual stage erbium-doped fiber amplifier (EDFA). Three signals were involved: the first two were channel signals at respectively 1533.4 nm and 1539.6 nm (input power of −30 dBm) whereas the third signal is a saturating tone at 1559.3 nm (input power of −10 dBm). The saturating tone is used to simulate the multiple channels of a WDM link (100 channels at −30 dBm or equivalently, 40 channels at −26 dBm). The wavelengths of the two channel signals were set to provide a maximum gain difference over the EDFA gain spectrum. This difference has been measured to be 5.05 dB. With the use of gain equalization, discrepancy of less than 0.1 dB is measured (FIG. 2). Without equalization (the circulator is replaced by an isolator), the gain at the output of the dual-stage amplifier is 28.2 dB at 1533.4 nm and 23.1 dB at 1539.6 nm. Once equalized, the gain becomes 24.8 dB at both wavelengths. The increase of gain at 1539.6 nm is due to the decrease of amplified spontaneous emission going from the first stage amplifier 13 to the second stage 18.

Figure 3:
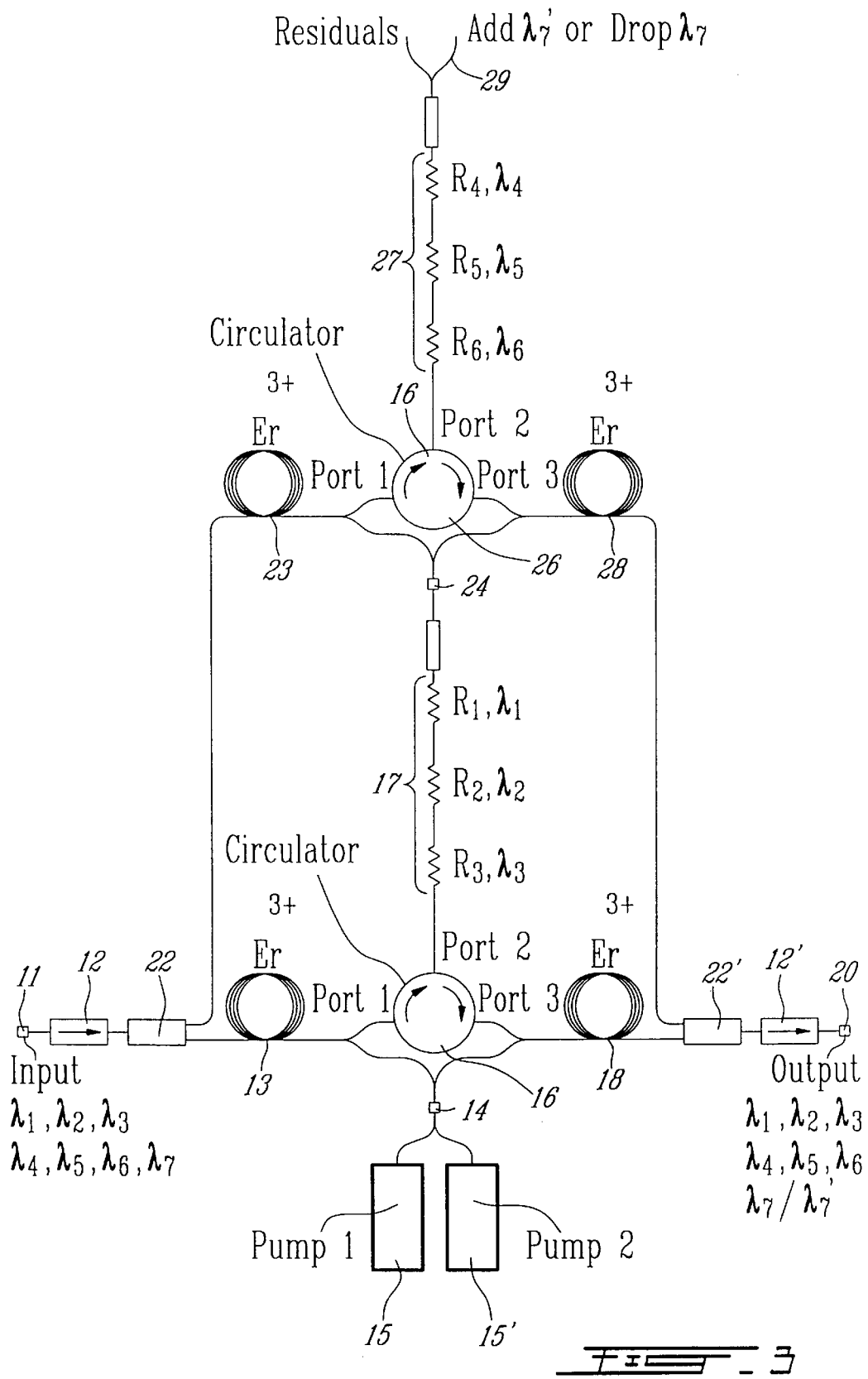
FIG. 3 is a schematic diagram of the optical amplifier according to an alternative embodiment in which a broader range of wavelengths are split and amplified in separate amplifier portions with pumping optical energy for the longer wavelength amplifier coming from a residual of the shorter wavelength amplifier.

As shown in FIG. 3, in an alternate embodiment for amplifying WDM signals covering spaced by a larger spectral region spread in wavelength, the input optical signal is split by an optical splitter 22 such that shorter wavelengths pass straight through the splitter 22 to first first-stage amplifier 13, and longer wavelengths are split off and fed into a second first-stage amplifier 23. The residual light (i.e. the light that is not reflected by the series of chired fiber Bragg gratings 17) from the first amplifier 13 is fed into 50—50 coupler 24 and is used to pump fiber amplifiers 23 and 28. It is possible to use the residual light from the first amplifier as pumping light for the second amplifiers 23 and 28, because the optical signals being amplified in the fibers 23 and 28 are of longer wavelength. As can be appreciated, the Bragg gratings 17 in the embodiment of FIG. 3 allow sufficient residual light to pass through so as to provide sufficient pumping power for the second amplifier.

In the preferred embodiment, the elements 23, 24, 26, 27 and 28 used in the second amplifier are of similar construction to the corresponding components 13, 14, 16, 17 and 18 in the first amplifier, except for the erbium-doped fiber sections being much longer (to optimize longer wavelength amplification). The second fiber Bragg grating 27 has gratings for wavelengths $\lambda_4$, $\lambda_5$ and $\lambda_6$, with an add/drop filter 29 for $\lambda_7$. The output from the second second-stage amplifier 28 and the first second-stage amplifier 18 are combined by combiner 22' before output.

Although the invention has been described above with reference to specific embodiments, it is to be understood that the above description is intended merely to illustrate the invention and not to limit the scope of the invention as defined in the appended claims.

What is claimed is:

1. An in-waveguide optical amplifier and signal conditioning apparatus comprising:

an optical wavelength splitter having an input and two outputs;

a first level first-stage in-waveguide optical amplifier receiving a first shorter wavelength one of said two outputs as an input first WDM optical signal;

a Bragg grating for carrying out at least one of dispersion compensation and equalization of said first WDM signal and for providing an optical pumping output of non-reflected optical power passing through said Bragg grating;

a first level second-stage in-waveguide optical amplifier;

an optical pump for pumping said first level first-stage and said first level second-stage optical amplifiers;

first optical circulator optically coupling an output of said first level first-stage amplifier to said Bragg grating and for coupling a reflected output of said Bragg grating to said first level second-stage amplifier;

a second level in-waveguide optical amplifier receiving a second longer wavelength one of said two outputs as an input second WDM optical signal;

a coupler connecting said optical pumping output of non-reflected optical power to said second level optical amplifier;

a combiner combining an output of said first level second-stage amplifier and an output of said second level amplifier together to form a single WDM amplified output signal.

2. The apparatus as claimed in claim 1, wherein said Bragg gratings have a variable reflectivity for at least two different optical communication channel wavelengths in said first WDM signal, said variable reflectivity being chosen to carry out equalization of said WDM signal being amplified.

3. The apparatus as claimed in claim 2, wherein said Bragg grating comprises a plurality of chirped gratings for carrying out dispersion compensation of a plurality of different optical communication wavelengths in said first WDM signal, whereby both dispersion compensation and equalization are carried out on said first WDM signal.

4. The apparatus as claimed in claim 1, wherein a gain of said first level first-stage amplifier is sufficient to amplify said WDM signal such that said WDM signal reflected from said Bragg grating has a sufficient intensity to substantially saturate said first level second-stage amplifier.

5. The apparatus as claimed in claim 2, wherein a gain of said first level first-stage amplifier is sufficient to amplify said WDM signal such that said WDM signal reflected from said Bragg grating has a sufficient intensity to substantially saturate said first level second-stage amplifier.

6. The apparatus as claimed in claim 3, wherein a gain of said first level first-stage amplifier is sufficient to amplify said WDM signal such that said WDM signal reflected from said Bragg grating has a sufficient intensity to substantially saturate said first level second-stage amplifier.

7. A method of conditioning a WDM optical communications signal, comprising the steps of:

amplifying said signal in a first in-waveguide stage to a first predetermined level of amplification;

optically circulating said amplified signal into a Bragg grating for conditioning channels of said WDM signal;

outputting signal transmitted through said Bragg grating into at least one in-waveguide optical amplifier amplifying signals at a wavelength longer than said WDM optical communications signal; and optically circulating said signal reflected from said Bragg grating into a second in-waveguide amplification stage substantially saturated by said reflected optical signal, an output of said second amplification stage providing said conditioned WDM optical communications signal.

8. A method of conditioning a WDM optical communications signal, comprising the steps of:

receiving an optical pumping signal from a Bragg grating of an amplifier operating at a shorter wavelength than said WDM optical communications signal;

amplifying said signal in a first in-waveguide stage to a first predetermined level of amplification;

optically circulating said amplified signal into a Bragg grating for conditioning channels of said WDM signal; and optically circulating said signal reflected from said Bragg grating means into a second in-waveguide amplification stage substantially saturated by said reflected optical signal, an output of said second amplification stage providing said conditioned WDM optical communications signal, wherein said optical pumping signal is used to optically pump at least one of said first and said second in-waveguide stages.

* * * * *